(12) United States Patent
Polansky et al.

(10) Patent No.: US 6,287,992 B1
(45) Date of Patent: *Sep. 11, 2001

(54) POLYMER COMPOSITE AND A METHOD FOR ITS PREPARATION

(75) Inventors: Christine A. Polansky, Brazoria; Jerry E. White, Lake Jackson, both of TX (US); Juan M. Garces; Alexander Kuperman, both of Midland, MI (US); David Z. Ridley, Angleton, TX (US)

(73) Assignee: The Dow Chemical Company, Midland, MI (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/062,915

(22) Filed: Apr. 20, 1998

(51) Int. Cl.$^7$ .................................................. B32B 3/00
(52) U.S. Cl. .......................... 442/59; 442/62; 524/445; 524/789; 524/791
(58) Field of Search ................... 442/59, 62; 524/445, 524/789, 791

(56) References Cited

U.S. PATENT DOCUMENTS

| | | | |
|---|---|---|---|
| 3,290,164 | 12/1966 | Ferrigno . | |
| 4,081,496 | 3/1978 | Finlayson . | |
| 4,528,235 | 7/1985 | Sacks et al. | 428/220 |
| 4,533,693 | 8/1985 | Wolfe et al. | 524/417 |
| 4,618,528 | 10/1986 | Sacks et al. | 428/216 |
| 4,739,007 | 4/1988 | Okada et al. | 524/789 |
| 4,810,734 | 3/1989 | Kawasumi et al. | 523/216 |
| 4,874,728 | 10/1989 | Eilliott et al. | 501/148 |
| 4,889,885 | 12/1989 | Usuki et al. | 524/445 |
| 5,385,776 | 1/1995 | Maxfield et al. | 428/297 |
| 5,554,670 | 9/1996 | Giannelis et al. | 523/209 |

FOREIGN PATENT DOCUMENTS

| | | |
|---|---|---|
| 93/04117 | 3/1993 | (WO) . |
| 93/11190 | 6/1993 | (WO) . |
| 95/14733 | 6/1995 | (WO) . |

OTHER PUBLICATIONS

"Curable Epoxy Vinylester or Polyester Composition Having a Low Peak Exotherm During Cure", filed in the United States of America on Feb. 10, 1995, Application Ser. No. 08/382,028: Applicant: Paul Patrick Kelly.

Davis, "Composites, High Performance", Kirk–Othmer Ency. Chem. Tech.—Supp., pp. 260–281.

Lan et al., "Mechanism of Clay Tactoid Exfoliation in Epoxy–Clay Nanocomposites", Chem. Mater., vol. 7, No. 11, pp. 2144–2150 (1995).

Messersmith et al., "Synthesis and Characterization of Layered Silicate–Epoxy Nanocomposites", Chem. Mater., vol. 6, No. 10, pp. 1719–1725 (1994).

Presteon, "Aramid Fibers", Kirk–Othmer Ency. Chem. Tech., pp. 213–242.

Reichle, "Catalytic Reactions by Thermally Activated, Synthetic, Anionic Clay Minerals", Journal of Catalysis, 94, pp. 547–557 (1985).

Shi et al., "Interfacial Effects on the Reinforcement Properties of Polymer–Organoclay Nanocomposites", Chem. Mater., vol. 8, No. 8, pp. 1584–1587 (1996).

Wang et al., "Clay–Polymer Nanocomposites Formed from Acidic Derivatives of Montmorillonite and an Epoxy Resin", Chem. Mater., vol. 6, No. 4, pp. 468–474 (1994).

Derwent, XP002108354 (JP 58 111820 A).

Primary Examiner—Helen L. Pezzuto
(74) Attorney, Agent, or Firm—Nemia C. Damocles (57) ABSTRACT

A polymer composite comprising an epoxy vinyl ester resin or unsaturated polyester matrix having dispersed therein particles derived from a multilayered inorganic material which possesses organophilic properties.

The dispersion of the multilayered inorganic material in the polymer matrix is such that an increase in the average interlayer spacing of the layered inorganic material occurs to a significant extent resulting in the formation of a nanocomposite.

19 Claims, 8 Drawing Sheets

POLYMER COMPOSITE AND A METHOD FOR ITS PREPARATION

BACKGROUND OF THE INVENTION

The present invention relates to a polymer composite comprising a polymer and an inorganic additive, more specifically, layers of a swellable material, and to a method for preparing the polymer composite.

Polymer composites comprising a polymer matrix having one or more additives such as a particulate or fiber material dispersed throughout the continuous polymer matrix are well known. The additive is often added to enhance one or more properties of the polymer.

Useful additives include inorganic layered materials such as talc, smectite clays and mica of micron size. These materials can also be referred to as inorganic silicates. Other inorganic layered materials which do not contain silicon may also be used.

A number of techniques have been described for dispersing the inorganic layered material into a polymer matrix. It has been suggested to disperse individual layers, for example, platelets, of the layered inorganic material, throughout the polymer. However, without some additional treatment, the polymer will not infiltrate into the space between the layers of the additive sufficiently and the layers of the layered inorganic material will not be sufficiently uniformly dispersed in the polymer.

To facilitate a more uniform dispersion of the layered inorganic material in the polymer, as described in U.S. Pat. No. 4,889,885, sodium or potassium ions normally present in natural forms of inorganic silicates or mica-type silicates and other multilayered particulate materials are exchanged with onium ions (for example, alkylammonium ions or suitably functionalized organosilanes). This cation exchange process can render the normally hydrophilic mica-type silicates organophilic and expand the interlayer distance of the layered material. An additional process of rendering the mica-type silicates as organophilic is to disperse or synthesize in a glycol or other appropriate solvent. The organophilic mica-type silicates include those materials commonly referred to as organoclays. Other processes may also render the previously hydrophilic mica-type silicate organophilic. Subsequently, the layered material (conventionally referred to as "nanofillers") is mixed with a monomer and/or oligomer of the polymer and the monomer or oligomer polymerized. The nanofiller may also be melt-compounded or melt-blended with polymer. Blending the nanofillers with the monomer, oligomer or polymer results in an increase of the average interlayer distance of the layered material. This increase in the average interlayer distance is referred to as delamination or exfoliation of the layered material.

In WO 93/11190, an alternative method for forming a polymer composite is described in which a layered, particulate material having reactive organosilane compounds is dispersed in a thermoplastic polymer or vulcanizable rubber.

Yet additional polymer composites containing these so-called nanofillers and/or their methods of preparation are described in U.S. Pat. Nos. 4,739,007; 4,618,528; 4,528, 235; 4,874,728; 4,889,885; 4,810,734; and 5,385,776; WO 95/14733; WO 93/04117; Chem. Mater. Vol. 6, pages 468–474 and 1719–1725; and Vol. 7, pages 2144–2150; and Chem. Mater., Vol. 8, pages 1584–1587 (1996).

U.S. Pat. No. 5,554,670 describes cross-linked, epoxy-based nanocomposites produced from diglycidyl ether of bisphenol A (DGEBA) and certain specific curing agents. This patent teaches that bifunctional primary or secondary amines do not produce delaminated nanocomposite structures and instead result in opaque composites.

Chem. Mater., Vol. 8, pages 1584–1587 (1996) describes the importance of complete ion-exchange in the formation of organoclays to provide nanocomposites with maximized performance.

However, even with these numerous described composites and methods, it still remains desirable to have an improved method for forming polymer composites derived from a multilayered additive to make composites having improved properties over the polymer alone.

SUMMARY OF THE INVENTION

Accordingly, in one aspect, the present invention is a polymer composite comprising a matrix of an epoxy vinyl ester resin, an unsaturated polyester or a mixture thereof having dispersed therein delaminated or exfoliated particles derived from a multilayered inorganic material which possesses organophilic properties.

In a second aspect, the present invention is a method for forming a composite which comprises contacting an epoxy vinyl ester resin, an unsaturated polyester or a mixture thereof with a multilayered inorganic material which possesses organophilic properties.

The polymer composites of this invention can exhibit an excellent balance of properties and can exhibit one or more superior properties such as improved heat or chemical resistance, ignition resistance, flame retardance, superior resistance to diffusion of polar liquids and of gases, yield strength in the presence of polar solvents such as water, methanol, or ethanol, or enhanced stiffness and dimensional stability, as compared to composites which contain the same multilayered inorganic material which has not been rendered organophilic.

The polymer composites of the present invention are useful as barrier films, barrier foams, or other molded or extruded thermoset articles using any conventional thermoset fabrication methods. The articles can be used in a wide variety of applications including infrastructure such as bridges and roadways, marine applications, transportation (for example, automotive and aircraft) parts, electronics, business equipment such as computer housings, building and construction materials, and packaging material.

DETAILED DESCRIPTION OF THE INVENTION

In the present invention, the polymer matrix of the polymer composite comprises an epoxy vinyl ester resin or an unsaturated polyester or a mixture thereof.

The epoxy vinyl ester resins which can be employed in the practice of the present invention for preparing a polymer composite are described in copending application Ser. No. 382,028, filed Feb. 10, 1995, the teachings of which are incorporated herein by reference. In general, these epoxy vinyl ester resins can be prepared by (1) reacting a polyepoxide with an ethylenically unsaturated carboxylic acid to produce a reaction product which contains, in part, the functional group C(=O)—O—CH$_2$—CH$_2$OH produced by the interaction of an epoxide group with a carboxylic acid group, or (2) further condensation of the secondary hydroxyl groups contained in the above reaction product with a dicarboxylic acid anhydride to produce pendant half ester groups. The resulting epoxy vinyl ester resins can then be admixed with a polymerizable monomer containing a >C=CH$_2$ group. In the first stage of the resin preparation, the polyepoxide is preferably added in an amount sufficient to provide from 0.9 to 1.2 equivalents of epoxide per equivalent of carboxylic acid. If desired, the further condensation of the secondary hydroxyl groups is completed by the addition of a dicarboxylic acid anhydride to form pendant half ester groups with the secondary alcohol group generated from the epoxide-carboxylic acid reaction. The proportion of this added dicarboxylic acid anhydride can be varied to convert any or all of the secondary hydroxyl groups to pendant half ester groups.

Ethylenically unsaturated carboxylic acids which are preferred for reaction with the polyepoxide include the $\alpha,\beta$-unsaturated monocarboxylic acids and the hydroxyalkyl acrylate or methacrylate half esters of dicarboxylic acids. The $\alpha,\beta$-unsaturated monocarboxylic acids include such acids as acrylic acid, methacrylic acid, crotonic acid and cinnamic acid. The hydroxyalkyl group of the acrylate or methacrylate half esters preferably contains from two to six carbon atoms and may be, for example, hydroxyethyl, beta-hydroxy-propyl or beta-hydroxybutyl. The hydroxyalkyl group may also include an ether oxygen. The dicarboxylic acids can be either saturated or unsaturated in nature. Saturated acids include phthalic acid, chlorendic acid, tetrabromophthalic acid, adipic acid, succinic acid and glutaric acid. Unsaturated dicarboxylic acids include maleic acid, fumaric acid, citraconic acids, itaconic acid, halogenated maleic or fumaric acids and mesaconic acid. Mixture of saturated and ethylenically unsaturated dicarboxylic acids can be employed.

The half esters preferably employed are prepared by reacting substantially equal molar proportions of a hydroxyalkyl acrylate or methacrylate with a dicarboxylic acid anhydride. Other unsaturated anhydrides that can be employed include maleic anhydride, citraconic anhydride and itaconic anhydride. Preferred saturated anhydrides that can be employed include phthalic anhydride, tetrabromophthalic anhydride and chlorendic anhydride. Advantageously, a polymerization inhibitor, such as hydroquinone or the methyl ether of hydroquinone are useful in preparing the half esters.

Any of the known polyepoxides can be employed in the preparation of the epoxy vinyl ester resins. Preferred polyepoxides are glycidyl polyethers of polyhydric alcohols, polyhydric phenols, epoxy novolacs, elastomer modified epoxide, halogenated epoxides, epoxidized fatty acids or drying oil acids, epoxidized diolefins, epoxidized di-unsaturated acid ester, epoxidized unsaturated polyesters and mixtures thereof, as long as they contain more than one epoxide group per molecule. The polyepoxides may be monomeric or polymeric in nature. Preferred polyepoxides include glycidyl polyethers of polyhydric alcohols or polyhydric phenols, having weights per epoxide group (EEW) of 150 to 2,000. These polyepoxides are usually made by reacting at least two moles of an epihalohydrin or glycerol dihalohydrin with one mole of the polyhydric phenol and a sufficient amount of caustic alkali to combine with the halogen of the halohydrin. The products are characterized by the presence of more than one epoxide group per mole on average, i.e., a 1,2-epoxy equivalency greater than one.

Preferred dicarboxylic acid anhydrides for reaction with the secondary hydroxyl groups include both the saturated anhydrides, such as phthalic anhydride, tetra-bromo-phthalic anhydride and chlorendic anhydride, and the $\alpha,\beta$-unsaturated dicarboxylic acid anhydrides, such as maleic anhydride, citraconic anhydride and itaconic anhydride.

The polymerizable monomer may be any monomer which polymerizes with the epoxy vinylester resins or polyester resins. Preferably, the polymerizable monomer contains ethylenic unsaturation. A wide selection of polymerizable monomers containing a >C=CH$_2$ group is available from the many known classes of vinyl monomers. Preferred polymerizable monomers are styrene, o-methyl styrene, m-methyl styrene, p-methyl styrene, ortho, meta, and parahalostyrenes, vinyl naphthalene, the various alpha-substituted styrenes, as well as the various di-, tri- and tetra-halostyrenes and acrylic methacrylic and crotonic acid esters, which include both the saturated alcohol esters and the hydroxyalkyl esters or mixtures thereof. Styrene is the preferred copolymerizable monomer. Generally, the polymerizable monomer is present in amounts ranging from 20 to 60 weight percent of the vinyl ester resin composition depending upon the particular properties desired.

In the preparation of the epoxy vinyl ester resins, various inhibitors and catalysts may be used. Any of the well-known vinyl polymerization inhibitors, such as hydroquinone or the methyl ether of hydroquinone, can be used. Additionally, the reaction of the polyepoxide with the carboxylic acid may be conducted either in the presence or absence of a catalyst such as alcoholates and tertiary-amino phenols.

Preferred epoxy vinyl ester resins which can be employed in the practice of the present invention in preparing the polymer composite are those supplied by The Dow Chemical Company under the trademark DERAKANE. Particularly preferred is the general purpose resin known as DERAKANE 411-45 epoxy vinyl ester resin, which contains approximately 45 percent monomeric styrene. Other DERAKANE epoxy vinyl ester resins which can be employed, for example, include DERAKANE 411-C-50 epoxy vinyl ester resin containing approximately 50 percent monomeric styrene; DERAKANE 470-36 epoxy vinyl ester resin containing approximately 36 percent monomeric styrene; DERAKANE 470-30 epoxy vinyl ester resin containing approximately 30 percent monomeric styrene; DERAKANE 510-A-40 epoxy vinyl ester resin, a brominated vinyl ester resin containing approximately 40 percent monomeric styrene; DERAKANE 790 epoxy vinyl ester resin containing approximately 45 percent monomeric styrene; and DERAKANE 8084 epoxy vinyl ester resin, a fluidized epoxy vinyl ester resin containing approximately 40 percent monomeric styrene.

The unsaturated polyesters which can be employed in the practice of the present invention are well known. They contain carboxylic ester groups and carbon—carbon double bonds as recurring units along the polymer backbone. They are usually prepared by condensation of (a) ethylenically unsaturated dicarboxylic or polycarboxylic acids or anhydrides to impart the unsaturation, (b) saturated dicarboxylic acids to modify the resin, and (c) diols or polyols. The unsaturated polyesters have the general structural formula:

$(R-O-C(=O)-R'-C(=O)-O)_x(R-O-C(=O)-CH=CH-C(=O)-O)_y$ wherein R and R' are alkylene or arylene radicals in the diol and saturated acid respectively, and x and y are variable numbers which depend upon the composition and condensation conditions.

Typical di or polycarboxylic acids or anhydrides thereof used in the preparation of the unsaturated polyesters include phthalic acids, iso- or terephthalic acid, adipic acid, succinic acid, sebacic acid, maleic acid, fumaric acid, citraconic acid, chloromaleic acid, allylsuccinic acid, itaconic acid, mesaconic acid, citric acid, pyromellitic acid, trimesic acid, tetrahydrophthalic acid, thiodiglycollic acid, and the like. These acids and anhydrides may be independently or jointly used.

Typical di- or polyhydric compounds used in the preparation of the unsaturated polyesters include ethylene glycol, diethylene glycol, triethylene glycol, propylene glycol, dipropylene glycol, glycerol, 2-butyn-1,4-diol, hydrogenated bisphenol A, bisphenoldioxyethyl ether, bisphenoldioxypropyl ether, neopentyl glycol and the like.

A variety of reactive diluents or monomers can be added to the unsaturated polyesters to lower their viscosity and to produce a thermoset product. In general, the reactive diluents or monomers are employed in an amount of from about 10 to about 25 parts by weight, preferably from about 10 to about 20 parts by weight per 100 part by weight based on the total weight of the curable composition excluding the weight of any reinforcing particles present in the composition. Specific examples of such reactive monomers include styrene, chlorostyrenes; methyl styrenes such as s-methyl styrene and p-methyl styrene; vinyl benzyl chloride, divinyl benzene, indene, allyl styrene, allyl benzene; unsaturated esters such as methyl methacrylate, methyl acrylate and other lower aliphatic esters of acrylic and methacrylic acids; allyl acetate, diallyl phthalate, diallyl succinate, diallyl adipate, diallyl sebacate, diethylene glycol bis(allyl carbonate), triallyl phosphate and diethylene glycol bis(allyl carbonate); triallyl phosphate and other allyl esters; and vinyl toluene, diallyl chloroendate, diallyl tetrachlorophthalate, ethylene glycol diethacrylate; and amides such as acrylamides; vinyl chloride, and mixtures thereof. Among these examples, styrene is preferred.

Curing catalysts can also be added to the unsaturated polyesters epoxy vinyl ester resins or mixtures thereof, or other mixtures where at least one component is an unsaturated polyester or epoxy vinyl ester resin. Examples of such curing catalyst include free radical initiators, such as azo compounds including azoisobutyronitrile, and organic peroxides, such as tertiary-butyl perbenzoate, tertiary-butyl peroctoate, benzoyl peroxide; methyl ethyl ketone peroxide, acetoacetic peroxide, cumene hydroperoxide, cyclohexanone hydroperoxide, and dicumyl peroxide. Methyl ethyl ketone peroxide and benzoyl peroxide are preferred. Preferably, the catalyst is used in an amount of from 0.03 to 2.5 parts by weight based on the total weight of the curable composition, excluding the weight of any reinforcing particles present in the composition.

The multilayered inorganic materials which can be employed in the practice of the present invention for preparing the polymer composites are any swellable layered inorganic materials. Typically, the layered inorganic material comprises layers having two opposing faces which may be relatively flat or slightly curved. Such materials are described in U.S. Pat. No. 4,889,885.

Representative examples of swellable layered inorganic materials employed in the practice of the present invention include the inorganic layered silicates such as montmorillonite, nontronite, beidellite, volkonskoite, hectorite, saponite, sauconite, magadiite, medmontite, kenyaite and vermiculite. Other layered materials or multilayered aggregates having little or no charge on the surface of the layers may also be used in this invention provided they can be intercalated with swelling agents which expand their interlayer spacing. Conversely, layered materials having more charge than those previously cited such as members of the mica family may also be used in this invention provided hey can be intercalated with swelling agents which expand their interlayer spacing. Mixtures of one or more such materials may also be employed.

Additional representative examples of layered materials include illite minerals such as ledikite; the layered double hydroxides or mixed metal hydroxides such as $Mg_6Al_{3.4}(OH)_{18.8}(CO_3)_{1.7}H_2O$ (see W. T. Reichle, J. Catal., 94 (1985), 547), which have positively charged layers and exchangeable anions in the interlayer spaces; chlorides such as $ReCl_3$ and $FeOCl$, chalcogenides such as $TiS_2$, $MoS_2$, and $MoS_3$; cyanides such as $Ni(CN)_2$; and oxides such as $H_2Si_2O_5$, $V_5O_{13}$, $HTiNbO_5$, $Cr_{0.5}V_{0.5}S_2$, $W_{0.2}V_{2.8}O_7$, $Cr_3O_8$, $MoO_3(OH)_2$, $VOPO_4$—$2H_2O$, $CaPO_4CH_3$—$H_2O$, $MnHAsO_4$—$H_2O$ and $Ag_6Mo_{10}O_{33}$. Other swellable layered inorganic materials or multi-layer aggregates having little or no charge on the surface of the layers may also be used in this invention provided they can be intercalated with swelling agents which expand their interlayer spacing. Mixtures of one or more such materials may also be employed.

The preferred swellable layered inorganic which can be employed in the practice of the present invention for preparing the polymer composite are those having charges on the layers and exchangeable ions such as sodium, potassium, and calcium cations, which can be exchanged, preferably by ion exchange, with ions, preferably onium ions such as ammonium cations, or reactive organosilane compounds, that cause the multi-lamellar particles to delaminate or swell. Typically, the negative charge on the surface of the swellable layered inorganic materials is at least 20 milliequivalents, preferably at least 50 milliequivalents, and more preferably from 50 to 150 milliequivalents, per 100 grams of the multilayered material. Particularly preferred are inorganic layered silicates such as montmorillonite, nontronite, beidellite, volkonskoite, hectorite, saponite, sauconite, magadiite, and kenyaite, with hectorite and montmorillonite having from 20 milliequivalents to 150 milliequivalents per 100 grams material. Preferred swellable layered inorganic materials are inorganic layered silicates having a negative charge on the layers ranging from 0.2 to 1.2 charges per formula unit, most preferred are inorganic layered silicates having a negative charge on the layers ranging from 0.2 to 0.9 charges per formula unit and a commensurate number of exchangeable cations in the interlayer spaces.

The swellable layered inorganic material can be rendered organophilic by a process known as "intercalation" which comprises introducing intercalants (neutral or charged species) into the interlayer or interfibril spaces of the swellable layered inorganic material by either insertion, in the case of neutral molecules, or ion exchange, in the case of ions. Intercalation can also increase the interlayer spacing of the swellable layered inorganic material. The term "interlayer or interfibril space or spacing" is meant herein the distance between the faces of the layers or the distance between fibrils. In the case of ions, the ions may be exchanged for larger species of the same charge such as, for example, the exchange of sodium or calcium ion with an onium cation. Henceforth, any layered material described containing a neutral or charged species in the interlayer region that results in an increase of the layer spacing prior to the formation of the composite will be referred to as an intercalated material or intercalated inorganic silicate. This description also includes those layered materials or inorganic silicates which have been rendered organophilic. Such materials are commonly known as organoclays.

The intercalants act to weaken the interlayer cohesive energy by swelling the interlayer distances and function to increase the compatibility and bonding of the layers with the polymer matrix by having attractive interaction with both the layers and the polymer. Intercalants which function to swell interlayer or interfibril distances are referred to hereinafter as "swelling agents," those which function to increase the compatibility and bonding of the layers or fibrils with the polymer are referred to as "compatibilizing agents" and those which function as swelling agents and compatibilizing agents are referred to as "swelling/compatibilizing agents."

The intercalant may be introduced into the spaces between every layer or fibril, nearly every layer or fibril of the swellable layered inorganic material, or a significant fraction of the layers or fibrils. The processes of introducing intercalants into the interlayer areas of swellable layered materials are known to those skilled in the art. See, for example, U.S. Pat. No. 4,889,885 to Usuki et al. It is not intended that these methods are limited to any specific process or procedure.

Intercalants typically contain a functional group which reacts with the surface of the layers of the layered material and displaces, totally or in part, the original ions, and bonds to the surface of the layers. These functional groups which are reactive with the polymer include nucleophilic or electrophilic functional groups which are capable of electrophilic or nucleophilic displacement reactions, coupling reactions and varying ring opening reactions. Examples of such functional groups include amino, carboxy, acylhalide, acyloxy, hydroxy, isocyanato ureido, halo, epoxy, and epichlorohydrin.

Typically, the intercalants also include a functional group whose cohesive energies are sufficiently similar to that of the polymer such that the surface of the layers is made more compatible with at least one polymer, thereby enhancing the homogeneity of the dispersion in the polymeric matrix. As used herein, the term "compatible" refers to the extent to which the polymer matrix and the layered material have a favorable interaction which promotes the intermingling of the matrix polymer and the layers of the layered material. Compatibility is derived from one or more of the following criteria: similar cohesive energy densities for the polymer and the derived particles, similar or complimentary capacities for dispersive, polar, or hydrogen bonding interactions, or other specific interactions, such as acid/base or Lewis-acid/Lewis-base interactions. Compatibilization will lead to an improved dispersion of the platelet particles in the matrix and an improved percentage of delaminated (or exfoliated) platelets. The increase in dispersion results in an increase in the average interlayer spacing of the layered material compared to the original intercalated inorganic silicate interlayer spacing prior to contact with the polymer matrix.

The intercalants which can be employed in the practice of the present invention include water-soluble polymers, onium compounds such as an ammonium, phosphonium or sulfonium salt, amphoteric surface-active agents, choline compounds, and organosilane compounds.

Representative examples of water-soluble polymers which can be employed as the organic intercalants in the practice of this invention are water-soluble polymers of vinyl alcohol such as poly(vinyl alcohol); polyalkylene glycols such as polyethylene glycol; water-soluble cellulose polymers such as methyl cellulose and carboxymethyl cellulose; the polymers of ethylenically unsaturated carboxylic acids such as poly(acrylic acid), and their salts; and polyvinyl pyrrolidone. The monomer unit of such polymers may also be used such as ethylene glycol, or mixtures of ethylene glycol and propylene glycol, or propylene glycol.

Representative examples of onium compounds which can be employed as the organic intercalants in the practice of the present invention include cationic surface-active agents, such as quaternary ammonium salts having octadecyl, hexadecyl, tetradecyl, or dodecyl moieties; with preferred quaternary ammonium salts including octadecyl trimethyl ammonium salt, dioctadecyl dimethyl ammonium salt, hexadecyl trimethyl ammonium salt, dihexadecyl dimethyl ammonium salt, tetradecyl trimethyl ammonium salt, ditetradecyl dimethyl ammonium salt dihydroxyethyl methyl octadecyl ammonium salt, dihydroxyethyl methyl hydrogenated tallow ammonium salt, quaternary ammonium salts containing substituents incorporating polyoxyalkylene segments and salts of polyoxyalkylene polyamines, such as the JEFFAMINE products of Huntsman Corp.

Representative examples of the amphoteric surface-active agents which can be employed as the organic intercalants in the practice of this invention include surfactants having an aliphatic amine cationic moiety and a carboxyl, sulfate, sulfone or phosphate as the anionic moiety.

Representative examples of choline compounds which can be employed as the organic intercalants in the practice of this invention include [HOCH$_2$CH$_2$N(CH$_3$)$_3$]+OH—, C$_5$H$_{14}$ClNO, C$_5$H$_{14}$NOC$_4$H$_5$O$_6$, C$_5$H$_{14}$NOC$_6$H$_7$O$_7$, and C$_5$H$_{14}$NOC$_6$H$_{12}$O$_7$.

Representative examples of organosilane compounds which can be employed as the organic intercalants in the practice of this invention include silane agents of the formula:

where (—) is a covalent bond to the surface of the layered material, m is 0, 1 or 2; n is 1, 2 or 3 with the proviso that the sum of m and n is equal to 3; R$^1$ is a nonhydrolyzable organic radical (including alkyl, alkoxyalkyl, alkylaryl, arylalkyl, and alkoxyaryl) and is not displaceable during the formation of the composite; R is the same or different at each occurrence and is an organic radical which is not hydrolyzable and displaceable during the formation of the composite which is reactive with the polymer matrix or at least one monomeric component of the polymer. Representative R groups include amino, carboxy, acylhalide, acyloxy, hydroxy, isocyanato ureido, halo, epoxy, and epichlorohydryl. Preferred organosilane intercalants include long-chain branched quaternary ammonium salts and/or suitably functionalized organosilane compounds, as disclosed in WO 93/11190, pages 9–21.

Organic materials other than those described can also be employed as the organic intercalants provided they can be intercalated between the layers of the multilayered particulate material.

Preferably, the intercalated layered material of the present invention is an intercalated silicate having a layer thickness of from 7 Å to 12 Å. This layer thickness does not include the thickness of the intercalant moiety. The polymer composite of this invention can be formed from the intercalated multilayered material and the vinyl ester or unsaturated polyester or mixture thereof by any suitable process for forming polymer composites.

In cases where the intercalated multilayered material and/or the vinyl ester or unsaturated polyester are solid or viscous liquids, an inert solvent or diluent can be used advantageously. Suitable such inert solvents or diluents are known to those skilled in the art and includes ketones, such as acetone, methyl ethyl ketone, or hydrocarbons, such as benzene, toluene, xylene and cyclohexane.

If solvents are employed in the preparation of the polymer composite and the resulting product is to be used for coating purposes, the solvent is typically retained in the product. Otherwise, the solvent is removed by any suitable method such as by distillation.

The intercalated layered material can be dispersed in the monomer(s) which form the polymer matrix and the monomer(s) polymerized in situ or alternatively, can be dispersed in the vinyl ester or unsaturated polyester or mixture thereof, in melted or liquid form.

A vinyl ester or unsaturated polyester liquid or melt containing the intercalated, multilayered particulate material may also be formed by reactive melt processing in which the intercalated, multilayered material is initially dispersed in a liquid or solid monomer or cross-linking agent which will form or be used to form the polymer matrix of the composite. This dispersion can be injected into a polymer melt containing one or more polymers in an extruder or other mixing device. The injected liquid may result in new polymer or in chain extension, grafting or even cross-linking of the polymer initially in the melt.

In either the in-reactor blending process or the melt-blending process, useful layered and fibrillar inorganic materials are preferably those which have been swollen and or intercalated between layers or fibrils with an organophilic intercalant.

Methods for preparing a polymer composite using in situ type polymerization are also known in the art and reference is made thereto for the purposes of this invention. In applying this technique to the practice of the present invention, the composite is formed by mixing monomers and/or oligomers with the intercalated, multilayered material in the presence or absence of a solvent and subsequently polymerizing the monomer and/or oligomers to form the vinyl ester or unsaturated polyester matrix of the composite. After polymerization, any solvent that is used is removed by conventional means.

The intercalated, multilayered material is advantageously dispersed under conditions such that at least about 50, preferably at least about 70, more preferably at least about 80, and most preferably at least about 90, weight percent of the layers of the intercalated, multilayered, material present in the polymer composite has a greater interlayer spacing than the inorganic silicate or inorganic aluminate before it is added to the polymer matrix. It is quite probable that the layers of the filler will not disperse or delaminate completely in the polymer, but will form layers in a coplanar aggregate. These layers are advantageously sufficiently dispersed or delaminated in the matrix polymer such that a significant portion of the layers have an interlayer spacing greater than 30 Å, preferably 50 Å. Preferably at least 50 percent of the layers will exhibit this type of spacing, more preferably greater than 70% of the interlayer spacing will be greater than 50 Å.

The dimensions of the dispersed delaminated layers may vary greatly, but in the case of particles derived from clay minerals, the particle faces are roughly hexagonal, circular, elliptical, or rectangular and exhibit maximum diameters or length from 50 Å to 50,000 Å. As such the aspect ratio will be between 5 and 5,000 assuming a typical layer thickness of approximately 10 Å. The aspect ratio which is most advantageously employed will depend on the desired end-use properties. The particle faces may also be needle-like.

Optionally, the polymer composites of the present invention may contain various other additives such as nucleating agents, other fillers, lubricants, plasticizers, chain extenders, colorants, mold release agents, antistatic agents, pigments, or fire retardants. The optional additives and their amounts employed are dependent on a variety of factors including the desired end-use properties.

The polymer composites of this invention exhibit useful properties. For example, they may exhibit enhanced yield strength and tensile modulus, even when exposed to polar media such as water or methanol; enhanced heat resistance and impact strength; improved stiffness, wet-melt strength, dimensional stability, and heat deflection temperature, and decreased moisture absorption, flammability, and permeability as compared to the same polymers which contain the same multilayered material which has not previously been intercalated or where no intercalated material is employed. Improvements in one or more properties can be obtained even though small amounts of intercalated multilayered materials are employed.

The polymer composites of the present invention can be molded by conventional shaping processes such as melt-spinning, casting, vacuum molding, sheet molding, injection molding and extruding, melt-blowing, spun-bonding, blow-molding, and co or multilayer extrusion. Examples of such molded articles include components for technical equipment, apparatus castings, household equipment, sports equipment, bottles, containers, components for the electrical and electronics industries, car components, and fibers, infrastructure applications such a roadways and bridge application, marine coating applications. The composites may also be used for coating articles by means of powder coating processes or as hot-melt adhesives.

The polymer composites of the present invention may be directly molded by injection molding or heat pressure molding, or mixed with other polymers. Alternatively, it is also possible to obtain molded products by performing the in situ polymerization reaction in a mold.

The polymer composites according to the invention are also suitable for the production of sheets and panels using conventional processes such as vacuum or hot pressing. The sheets and panels can be laminated to materials such as wood, glass, ceramic, metal or other plastics, and outstanding strengths can be achieved using conventional adhesion promoters, for example, those based on vinyl resins. The sheets and panels can also be laminated with other plastic films by coextrusion, with the sheets being bonded in the molten state. The surfaces of the sheets and panels, can be finished by conventional methods, for example, by lacquering or by the application of protective films.

The polymer composites of this invention are also useful for fabrication of extruded films and film laminates. Such films can be fabricated using conventional film extrusion techniques. The films are preferably from 10 to 100, more preferably from 20 to 100, and most preferably from 25 to 75, microns thick.

The polymer composites of the present invention may also be useful in preparing fiber-reinforced composites in which a resin matrix polymer is reinforced with one or more reinforcing materials such as a reinforcing fiber or mat. Fibers which can be employed in the process of the present invention are described in numerous references, such as, for example, U.S. Pat. No. 4,533,693; Kirk-Othmer Ency. Chem. Tech., *Aramid Fibers,* 213 (J. Wiley & Sons 1978); Kirk-Othmer Ency. Chem., Tech.—Supp., *Composites, High Performance,* pages 261–263; Ency. Poly. Sci. & Eng. The fibers can be of varying composition, provided that they do not melt during the preparation of the composite and, in general, are chosen so that the fibers provide improvements in physical properties, such as tensile strength, flexural modulus, and electrical conductivity. Thus, high flexural modulus organic polymers such as polyamides, polyimides, and aramids, metals, glass and other ceramics, carbon fibers, and graphite fibers are suitable fiber materials. Examples of glass fibers, include E-glass and S-glass. E-E-glass is a low alkali, aluminum-borosilicate composition with excellent electrical properties and good strength and modulus. S-glass is a magnesium-aluminosilicate composition with considerably higher strength and modulus. Fiber rovings are also useful. A roving consists of a number of continuous yarns, strands, or tows, collected into a parallel bundle with little or no twist. The fiber-reinforced composites are useful in aircraft, aerospace, marine, transportation and other commercial applications. They are also useful as construction materials and corrosion resistant agents. They are also useful in the manufacture of containers, electrical and appliance parts and other consumer products.

The following working examples are given to illustrate the invention and should not be construed as limiting its scope. Unless otherwise indicated, all parts and percentages are by weight.

EXAMPLES

The following materials were used in the Examples:

Dowanol™ DPM: Dipropylene glycol methyl ether, solubility parameter 9.3, a product of The Dow Chemical Company.

DER™383 A liquid bisphenol A-based epoxy resin having an epoxy equivalent weight (EEW) of 180, a product of The Dow Chemical Company.

A-2 Catalyst: Tetrabutyl phosphonium acetate (70% solution in methanol).

GMAA: Glacial methacrylic acid.

DMP 30: Tris-2,4,6-dimethylamine methyl phenol.

MEKP: Methyl ethyl ketone peroxide.

Clay A: 27 wt % dispersion of hectorite in propylene glycol.

Clay B: Na-montmorillonite that has been cation-exchanged with methyl, bis(2-hydroxyethyl), tallow ammonium chloride.

BPO: Benzyol Peroxide.

DMA: N,N-Dimethylaniline.

The following methods were used to characterize the polymer composites:

X-Ray Diffraction (XRD)

XRD measurements were taken on nanocomposite plaques using a Cu X-ray source. Patterns were measured between 1.5 and 45° 2q. The X-ray intensities are relative to the intensity of the polymer scattering.

Peak positions were graphically measured and were approximate to the peak maximum. The error in peak position measurement was estimated to be in the order of 0.2° 2q. The error in measurement may be larger depending on the peak intensity, the peak broadness, and any displacement of the sample on the X-ray instrument from the ideal sample height.

The peak position was used to calculate the peak d-space based on Bragg's law:

$$nl=2d(\sin q)$$

wherein l is the X-ray wavelength in Å; d is the d-space in Å; and q is half of diffraction angle, ° b 2q; n is an integer and has the value of "1".

D-space and/or peak position are both commonly reported.

Transmission Electron Microscopy

The epoxy samples were trimmed to approximately 200× 300 micrometers in length. Ultra thin sections of approximately 80 nanometers were obtained by microtoming the samples. The sections were placed on a TEM grid for examination on a transmissions electron microscope (TEM).

Example 1

A. Preparation of Clay A

Magnesium chloride hydrate (13 g) was dissolved in water (600 mL) and stirred. After the solution became clear, 2N ammonium hydroxide solution (88 mL) was added. Water was added until the total volume equaled 800 mL and stirring was continued for one hour. The precipitate was then allowed to settle. The water was decanted from the precipitate. The magnesium hydroxide solids were washed with 500 mL of water and decanted. Washing was repeated by adding 2 N silver nitrate until no chloride ions were detected in the decanted liquid. The washed magnesium hydroxide was dried at 60° C. for about 16 hours. Magnesium hydroxide (14.96 g) was dissolved in water (800 ml). In a separate container lithium fluoride (1.76 g.) was added to water (928 mL). Both solutions were mixed until they became homogeneous (about 10 minutes). The two solutions were then added together into a 4 liters beaker. The combined solutions were mixed for 20 minutes. Ethylene glycol (938 g) and water (368 mL) were then added to the 4 liters beaker. Immediately following the glycol addition, colloidal silica (73.6 g) was added to the preparation. Water was added so the total volume of the mixture was 4 liters (about 900 mL water). The solution was refluxed at 90° C. for 12 days. After the synthesis was completed, the preparation was centrifuged at 1500 RPM for 30 minutes. The centrifuged product was decanted, and 2 liters of water was added to the product and mixed. The wash was again centrifuged for 30 minutes at 1500 RPM. A 2-liter wash was repeated twice, decanting the water after each wash. After the final wash, the product was placed in a Pyrex drying dish in a 55° C. oven for more than 7 days. TGA analysis was completed to confirm the amount of hectorite in the final product, as well as to confirm that water had been fully removed from the resulting product. TGA showed that 26.68% of the product was Li-hectorite.

B. Preparation of Unsaturated Polyester/Clay Composite

Figure 1:
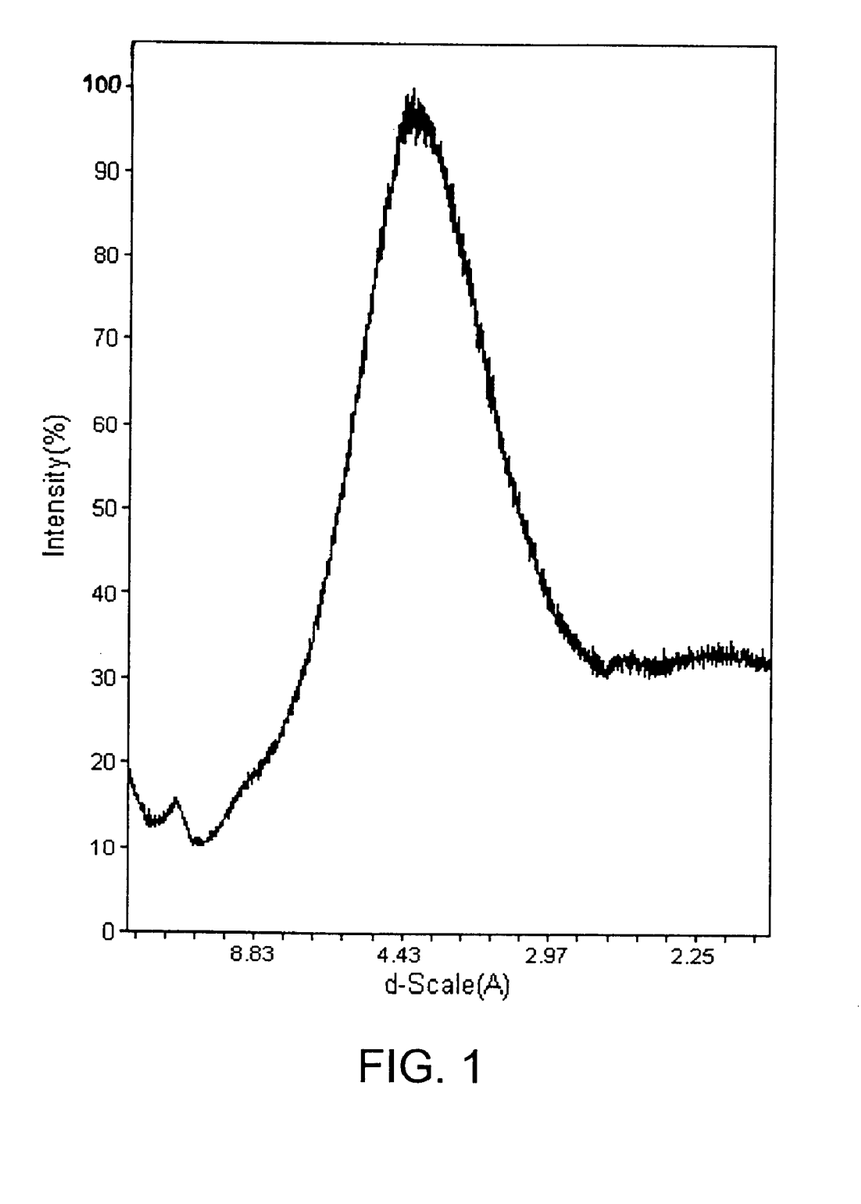
FIG. 1 is an XRD (X-Ray Diffraction) pattern of the unsaturated polyester composite described in Example 1.

Isophthalic acid (269.42 g) was blended with the Clay A dispersion prepared in Part A. The mixture was heated to approximately 200° C. to allow the removal of water from the reaction product mixture. The reactant mixture was cooled to approximately 160° C. Additional propylene glycol (372.2 g) and maleic anhydride (635.54 g) were added to the reaction vessel. The acid number of the reaction mixture was monitored until it dropped to approximately 34. Hydroquinone, an inhibitor, (0.29 g) was added to the polymer followed by the addition of styrene monomer (890.9 g). An XRD of the preparation is shown in FIG. 1.

Example 2

An unsaturated polyester, such as a DCPD (dicyclopentadiene) polyester synthesized using 50% EG (ethylene glycol) and 50% DEG (diethylene glycol) let down with styrene was blended with Clay B. The clay was dispersed through shear and sonication. The final clay loading was between 2 and 6 wt %. The preparation was cured using 0.2 wt % Co naphthenate and 1.25 wt % MEKP. The resultant composite exhibited an increase in the basal spacing of the clay from approximately 19 Å to more than 38 Å, as observed in the X-ray diffraction pattern shown in FIG. 2.

Example 3

Clay B was dispersed in DER™ 383 at an initial loading of approximately 6 wt %. The D.E.R. 383/Clay B was used in the synthesis of a vinyl ester/clay composite.

The epoxy vinyl ester resin was prepared by adding D.E.R. 383/Clay B (4502 g), Bisphenol A (167.6 g) and A-2 catalyst (0.383 g) to a reactor under a nitrogen sparge and advancing the resin to a set epoxy equivalent weight(EEW). The resin was heated to 65.5° C. and allowed to react for 1.5 hours. After 1.5 hours, more D.E.R. 383/Clay B (168.5 g) was added to bring the EEW down to a set EEW. The temperature of the reactor was brought down to below 90° C. Once the temperature was below 90° C., the nitrogen was changed to an air sparge. Hydroquinone (0.698 g) and GMAA (169.1 g) were added.

When the temperature reached 80° C., DMP-30 (1.18 g) was added. The temperature was slowly raised to 118° C. The reaction was allowed to cook until the percent acid was at 1.1%. Acid and epoxy titrations were run every hour after the temperature reached 118° C. The percent acid should be 0.2 to 0.4% acid high. When the acid reached 1.1%, the heat was turned off and an inhibitor (oxalic acid) was added with styrene (400 g). Once the temperature was below 100° C., additional styrene (383 g) was added. The resin was allowed to cool to 30° C. and packaged.

Figure 3:
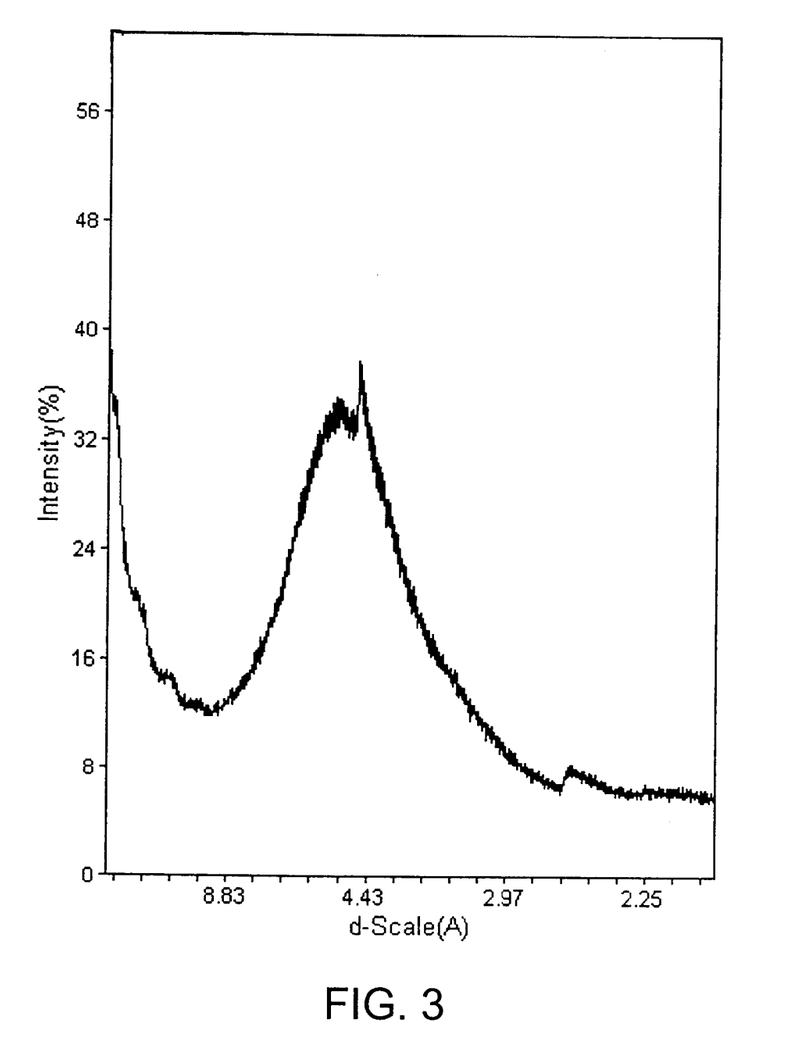
FIG. 3 is an XRD pattern of the vinyl ester composite prior to curing described in Example 3.

A sample of the vinyl ester resin was pulled prior to the addition of styrene. An XRD pattern of this sample is shown in FIG. 3.

Figure 4:
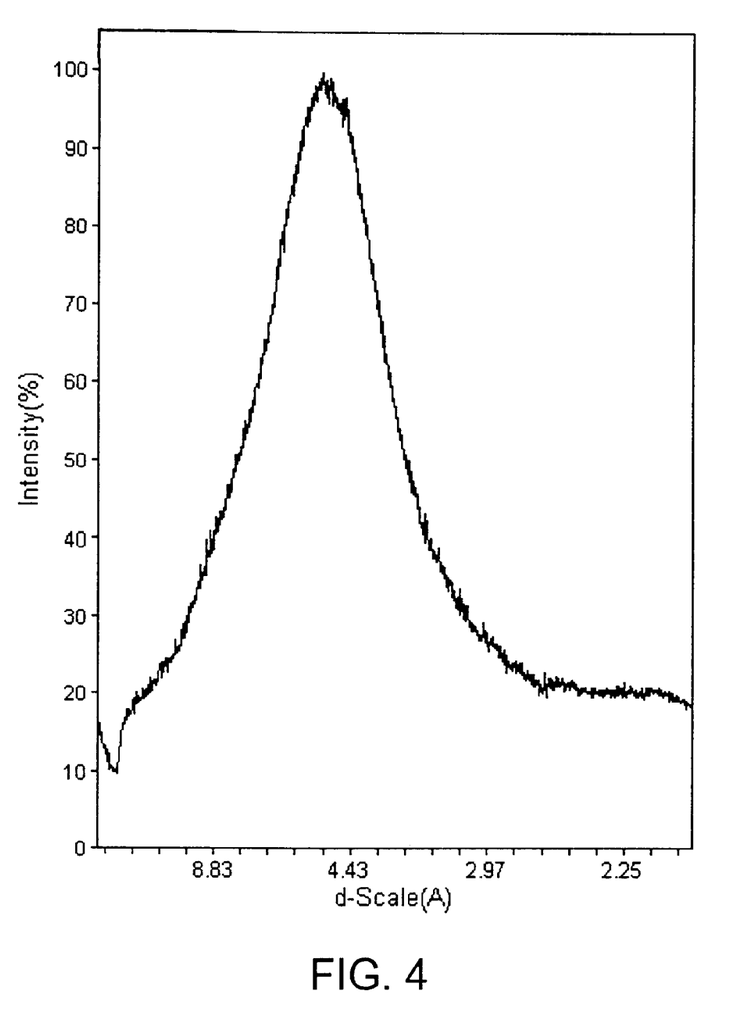
FIG. 4 is an XRD pattern of the vinyl ester composite after curing with cobalt naphthenate described in Example 3.
Figure 5:
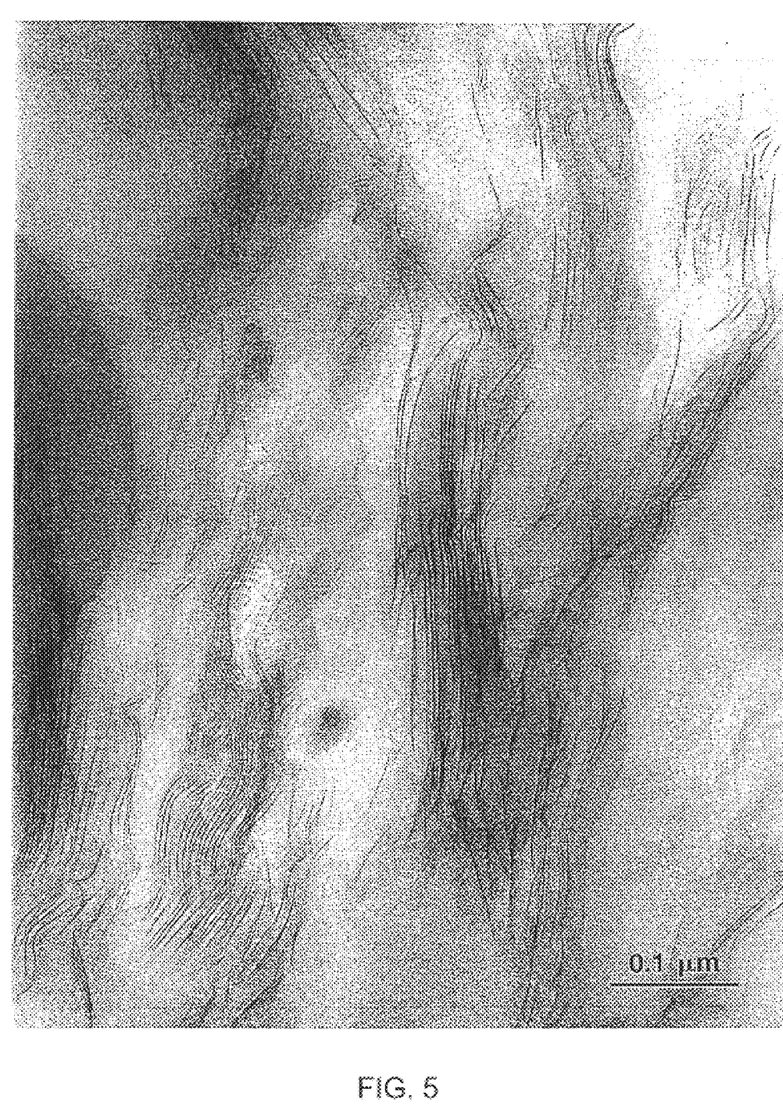
FIG. 5 is a TEM (Transmission Electron Microscopy) image of the vinyl ester composite shown in FIG. 4 which was cured with cobalt naphthenate and MEKP at 300 magnification.

After the styrene addition was completed, a portion of the resin was cured. An XRD pattern of the preparation cured with cobalt naphthenate and methyl ethyl ketone peroxide using methods known to those skilled in the art is shown in FIG. 4. A TEM micrograph of the preparation is shown in FIG. 5.

Figure 6:
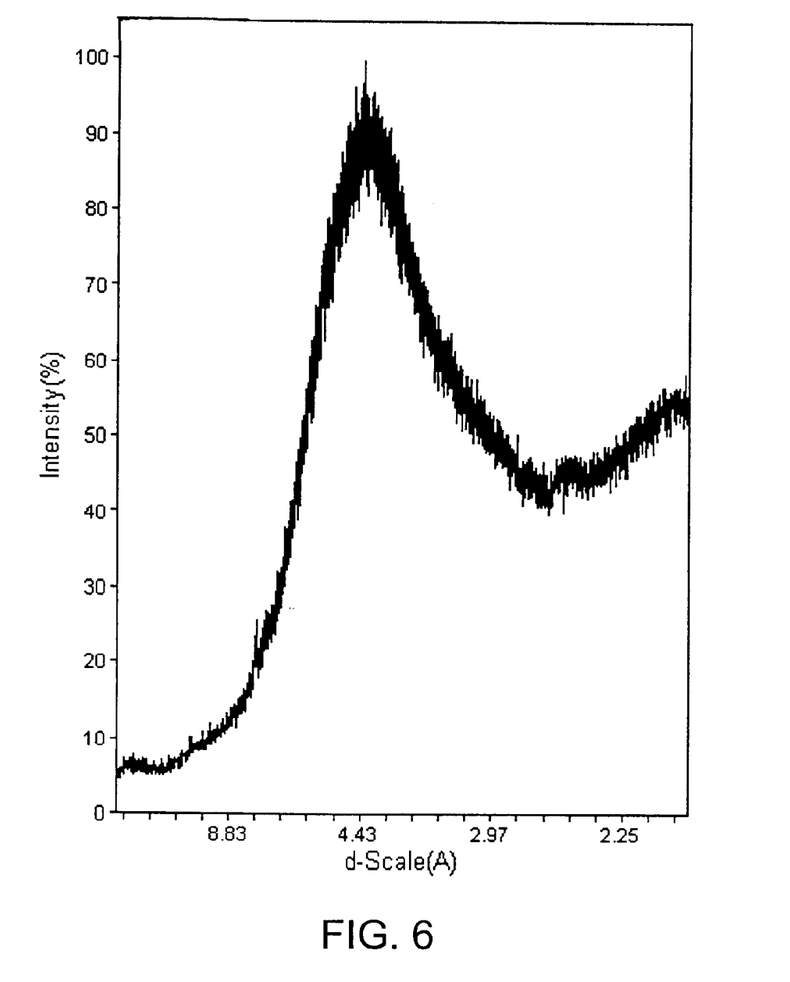
FIG. 6 is an XRD pattern of the vinyl ester composite after curing with benzyol peroxide(BPO) and N,N-Dimthylaniline(DMA) described in Example 3.
Figure 7:
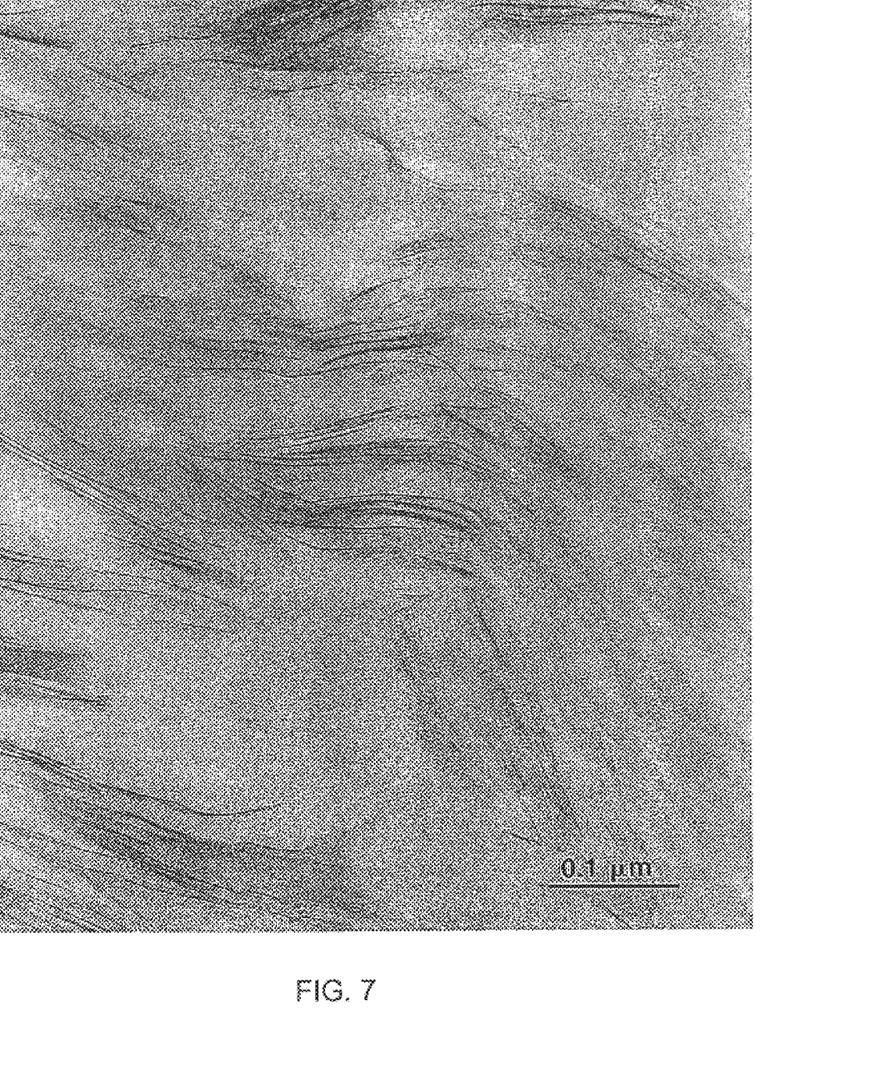
FIG. 7 is a TEM image of the vinyl ester composite shown in FIG. 5 and described in Example 3 which was cured with BPO and DMA at 300 magnification.

A second portion of the resin was cured with BPO and DMA using methods known to those skilled in the art. An XRD pattern of the cured preparation is shown in FIG. 6. A TEM micrograph of the preparation is shown in FIG. 7.

The samples that were cured were prepared by shearing in 18 g of the clay to 282 g of the resin. The resin and clay mixture were than catalyzed with appropriate catalysts. The resin mixture was then poured into a mold. The mold was placed in an oven at 110° C. for two hours. The mold was allowed to cool to room temperature before removing the cured resin sample. An XRD pattern of the vinyl ester composite is shown in FIG. 8.

The X-ray peaks for the XRD patterns shown in FIGS. 1, 2, 3, 4, 6 and 8 are described in Table I.

TABLE I

Figure 2:
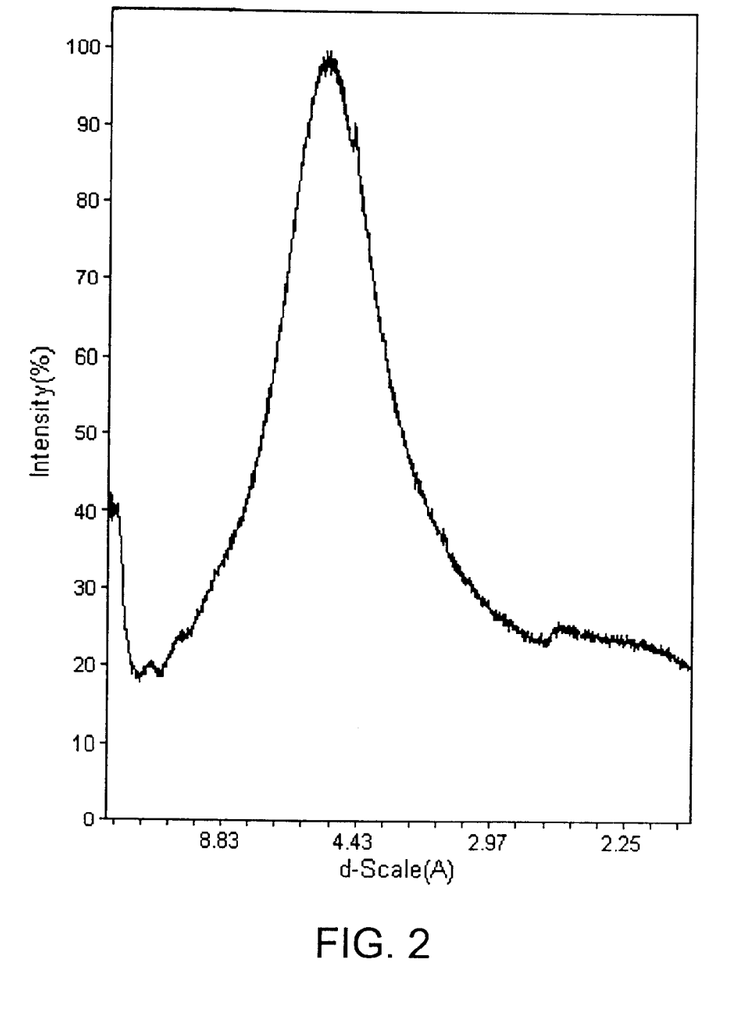
FIG. 2 is an XRD pattern of the unsaturated polyester composite described in Example 2.
Figure 8:
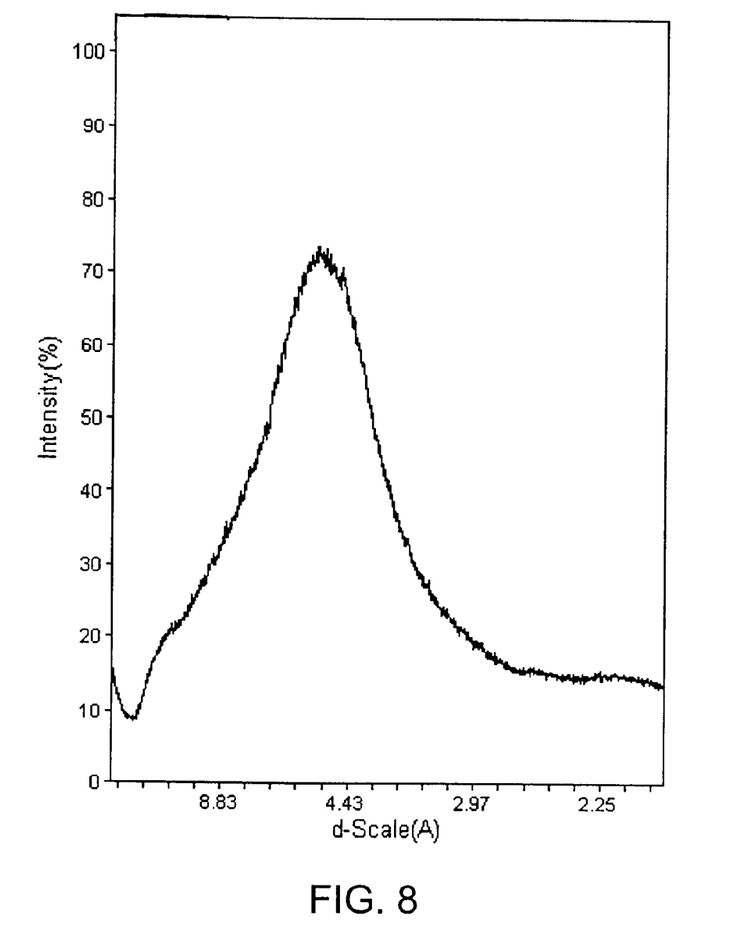
FIG. 8 is an XRD pattern of a vinyl ester composite formed by adding Clay B after synthesis of the vinyl ester described in Example 3.

| Example | X-ray Peaks | |
|---|---|---|
| | Approximate Peak Position (° 2 q) | Approximate Peak d-space (Å) |
| FIG. 1 | 4.8 | 18 |
| FIG. 2 | 2.2 | 40 |
| | 4.6 | 19 |
| | 6.8 | 13 |
| FIG. 13 | 2.0 | 44 |
| | 3.6 | 24 |
| | 5.9 | 15 |
| FIG. 4 | none observed | |
| FIG. 6 | none observed | |
| FIG. 8 | none observed | |

What is claimed is:

1. A polymer composite comprising a matrix of an epoxy vinyl ester resin having dispersed therein a multilayered inorganic material intercalated with an intercalating agent selected from the group consisting of water-soluble polymers, onium compounds, amphoteric surface-active agents, choline compounds and organosilane compounds.

2. The polymer composite of claim 1 wherein the epoxy vinyl ester resin contains from about 20 to about 60 percent monomeric styrene.

3. The polymer composite of claim 1 wherein the epoxy vinyl ester resin is brominated and contains about 40 percent monomeric styrene.

4. The polymer composite of claim 1 wherein the epoxy vinyl ester resin is a fluidized epoxy vinyl ester resin containing about 40 percent monomeric styrene.

5. The polymer composite of claim 1 wherein the multilayered inorganic material is a swellable layered material.

6. The polymer composite of claim 5 wherein the swellable layered material is an inorganic layered silicate or inorganic layered aluminate or a mixture thereof.

7. The polymer composite of claim 6 wherein the inorganic layered silicate is a montmorillonite, hectorite, saponite, nontronite, beidellite, volhonskoite, sauconite, magadiite, medmontite, kenyaite, or vermiculite.

8. The polymer composite of claim 7 wherein the inorganic layered silicate has a cation exchange capacity between 20 and 200 milliequivalents per 100 g of multilayered material.

9. The polymer composite of claim 7 wherein the inorganic layered silicate contains an onium ion.

10. The polymer composite of claim 9 wherein the onium ion contains at least one moiety which renders the inorganic silicate organophilic.

11. The polymer composite of claim 9 wherein the onium ion is ammonium, phosphonium or a sulfonium cation.

12. The polymer composite of claim 11 wherein the ammonium cation is a primary, secondary, tertiary or a quaternary ammonium cation.

13. The polymer composite of claim 7 wherein the inorganic layered silicate is at least 0.01 weight percent and not more than 90 weight percent of the final composite.

14. The polymer composite of claim 7 wherein the inorganic layered silicate or inorganic layered aluminate present in the polymer composite has a greater interlayer spacing than the inorganic silicate or inorganic aluminate before it is added to the polymer matrix.

15. The polymer composite of claim 1 in the form of a coating, film, foam, laminate, fiber, hot-melt adhesive or molded article.

16. A polymer composite comprising a matrix of an epoxy vinyl ester resin having dispersed therein a clay composition comprising hectorite and propylene glycol.

17. A fiber-reinforced composite comprising a resin matrix polymer reinforced with one or more reinforcing fiber or mat, wherein the resin matrix polymer is a polymer composite comprising a matrix of an epoxy vinyl ester resin having dispersed therein a clay composition comprising hectorite and propylene glycol.

18. A polymer composite comprising a matrix of an epoxy vinyl ester resin having dispersed therein a multilayered inorganic material intercalated with an intercalating agent selected from the group consisting of choline compounds.

19. A fiber-reinforced composite comprising a resin matrix polymer reinforced with one or more reinforcing fiber or mat, wherein the resin matrix polymer is a polymer composite comprising a matrix of an epoxy vinyl ester resin having dispersed therein a clay composition comprising hectorite intercalated with propylene glycol or a choline compound.

* * * * *